US007006164B1

(12) United States Patent  (10) Patent No.: US 7,006,164 B1
Morris                    (45) Date of Patent:    Feb. 28, 2006

(54) AUTOMOBILE AUDIO-VIDEO THEATER SYSTEM

(75) Inventor: Roger C. Morris, 3917 Maple View Dr., Jacksonville, FL (US) 32224

(73) Assignee: Roger C. Morris, Jacksonville, FL (US)

( * ) Notice: Subject to any disclaimer, the term of this patent is extended or adjusted under 35 U.S.C. 154(b) by 655 days.

(21) Appl. No.: 10/137,955

(22) Filed: May 1, 2002

(51) Int. Cl.
    *H04N 7/18* (2006.01)
(52) U.S. Cl. .................. 348/836; 348/837; 381/77
(58) Field of Classification Search ............. 348/836, 348/837; 381/86, 302; 343/713; 455/418, 455/345, 89, 3.06; 725/75, 78
    See application file for complete search history.

(56) References Cited

U.S. PATENT DOCUMENTS 2,851,537 A * 9/1958 Rosenberg et al. ........... 381/78
3,162,726 A * 12/1964 Rosenberg et al. ........... 381/78
4,047,109 A * 9/1977 Sekiguchi ................. 455/3.06
4,209,663 A * 6/1980 Sekiguchi ................. 455/3.06
4,264,923 A * 4/1981 Reich ......................... 725/78
5,056,153 A * 10/1991 Taniguchi et al. ........ 455/556.1
5,281,985 A * 1/1994 Chan .......................... 353/13
5,301,368 A * 4/1994 Hirata ........................ 455/78
5,510,828 A * 4/1996 Lutterbach et al. ......... 725/138
5,722,069 A * 2/1998 Donner ...................... 455/418
6,043,783 A * 3/2000 Endo et al. ................ 343/713
6,330,337 B1 * 12/2001 Nicholson et al. ........... 381/86
2002/0023265 A1 * 2/2002 Metcalf ....................... 725/74
2003/0086574 A1 * 5/2003 Higgs ......................... 381/77

* cited by examiner

*Primary Examiner*—John Miller
*Assistant Examiner*—Paulos M. Natnael

(57) ABSTRACT

An automobile audio-visual theater system comprising a digital monitor, one or more audio-video media players; a line connecting the video signal of the one or more audio-video media players to the digital monitor; a line connecting the audio signal of the one or more audio-video players to an audio signal splitter having multiple line out signals; and a connection from a line out signal of the audio signal splitter to an automobile's audio system.

1 Claim, 4 Drawing Sheets

Description of Figures.

Description of Figures.

Figure 3, A is a schematic block diagram of a process for enhancing and combining automobile audio and video entertainment, showing how to interface the Automobile audio-video theater with a person's auto stereo system.
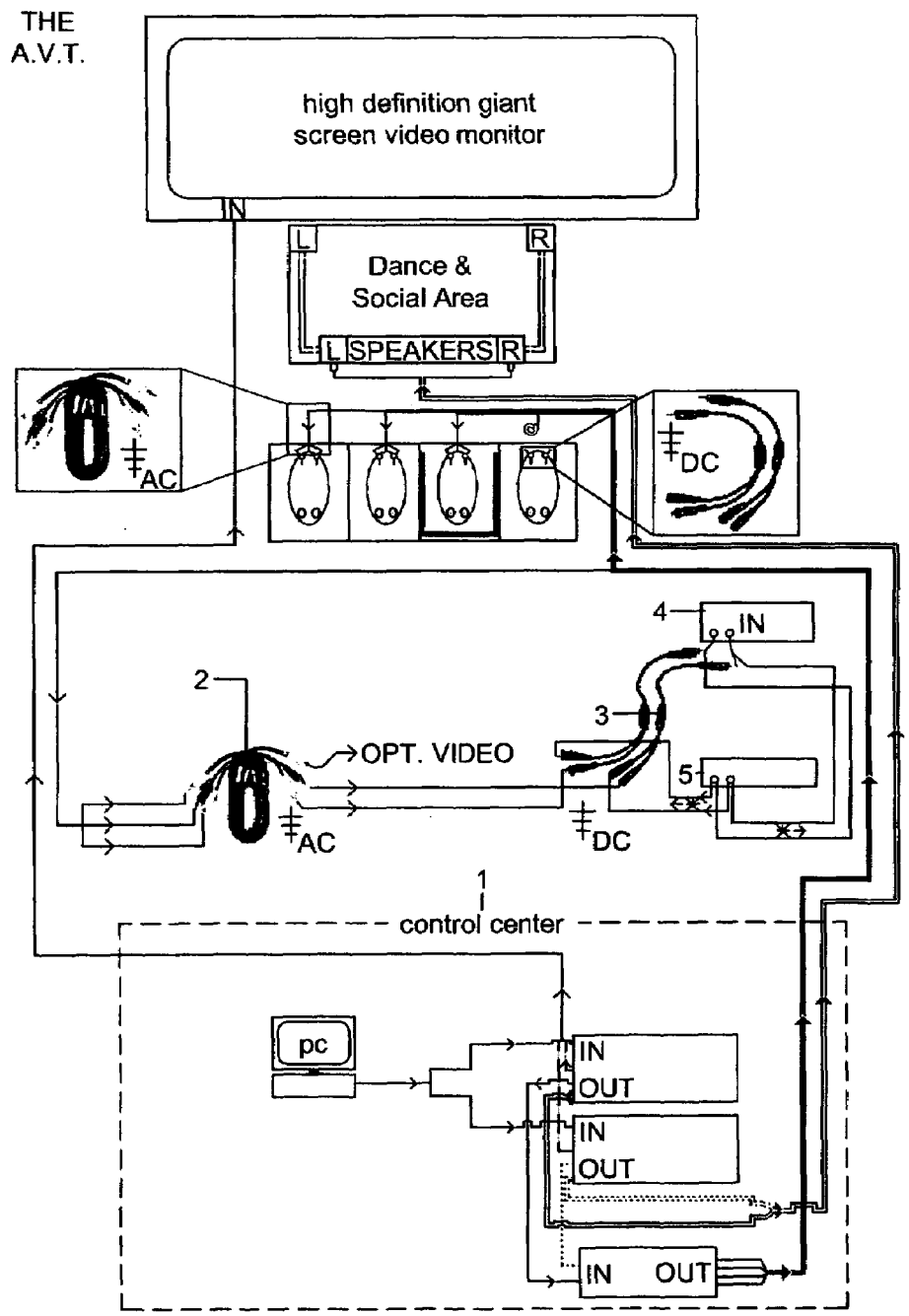
Figure 3, A Description of Figures:
Figure 3, B is an illustration of an automobile while visiting the Automobile audio-video theater. This shows how to interface the Automobile audio-video theater system with a person's auto stereo system thus creating a process for enhancing and combining automobile audio and video entertainment.
Figure 3, B
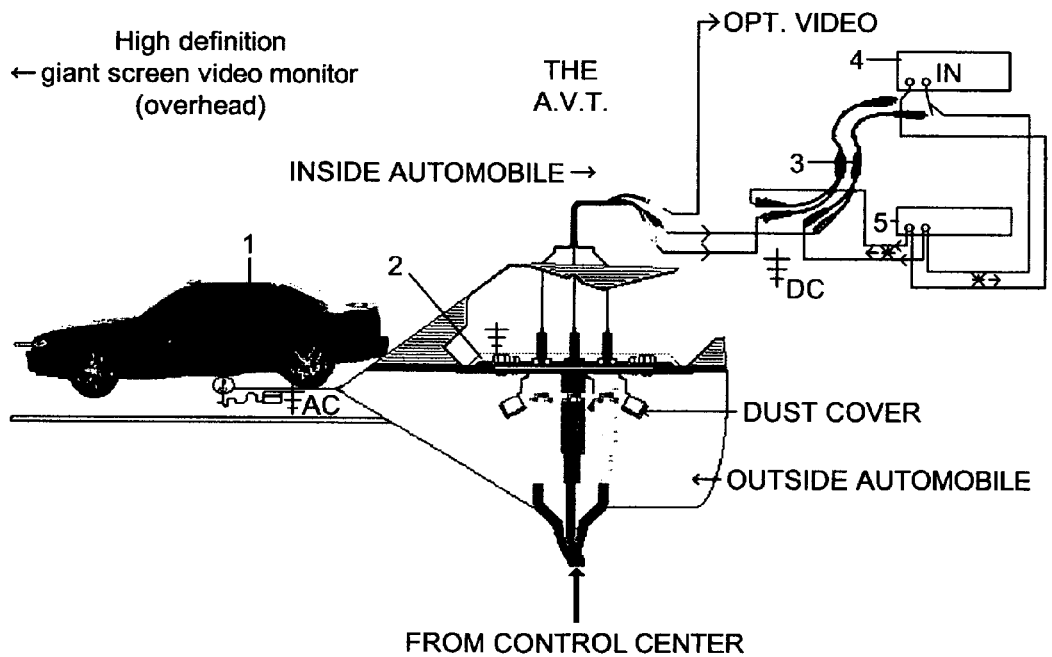
FROM CONTROL CENTER

AUTOMOBILE AUDIO-VIDEO THEATER SYSTEM

BACKGROUND OF THE INVENTION

Figure 1:
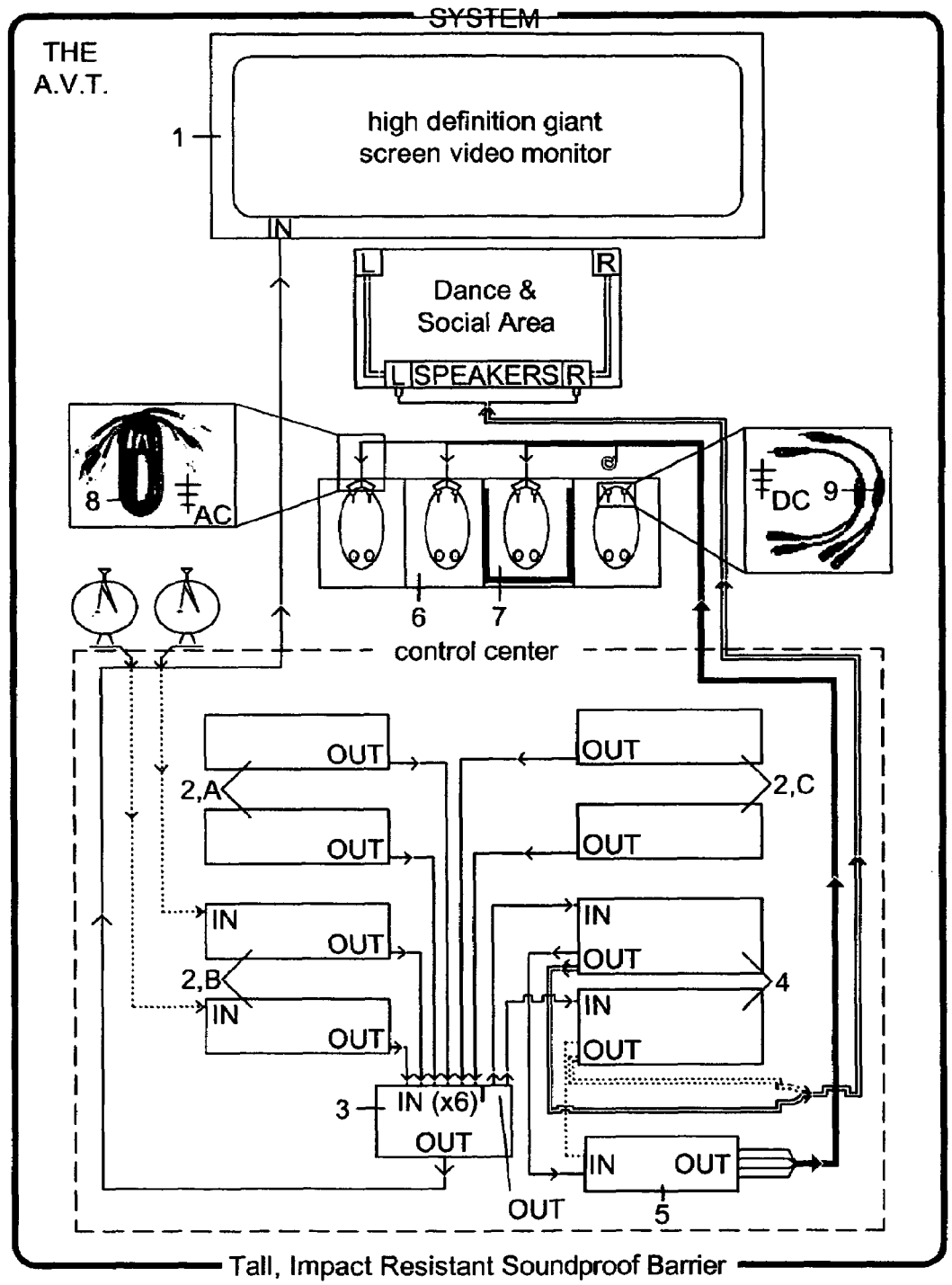
Figure 1 is a schematic block diagram of a process for enhancing and combining automobile audio and video entertainment.

This invention relates generally to the field of audio/video entertainment, and more particularly to an automobile audio-video theater system.

Audio and video entertainment has been a part of our lives for as long as anyone can remember, and live performances even longer still. First, issued a patent in 1847, was the radio to stun and amaze people by recreating live and recorded broadcasted entertainment, improved upon by the 1920 patent of the FM Radio Receiver. Later, patented in 1930, the television was introduced and our world changed forever. These two inventions play vital roles in most peoples lives everyday and are pioneers of the technological revolution in which we live today—in fact, life would not be as it is if the radio and television didn't exist. Later, patented in 1934, the automobile radio was introduced. In time, the drive-in theater presented a parking setup with the view of a giant motion picture projected image.

In recent years automobile audio manufacturers have improved auto stereo entertainment and provide a diverse line of digital audio equipment. This trend began in the early 1980s and continues to progress. By the mid-1980s the home audio industry introduced the compact disc player, which provided excellent audio quality by an unbelievably clear, crisp digital audio source and subsequently replaced the phonograph (derived from the gramophone patented in 1887, and cassette deck, derived from the audio tape recording device, patented in 1944) as a regular means of enjoying audio entertainment. In 1956 the computer memory device received a patent, which later lead to a means for audio and video computer convergence, which now is a vital primary element of the process for enhancing and combining automobile audio and video entertainment. Also by the mid-1980s, after a brief bout with the Floppy Disc and laser video player, the video cassette recorder, deriving from the 1960 patent of the videotape recorder, had dominated the home video entertainment arena and the VCR was in full swing as the most demanded, highest quality component of home video entertainment.

Shortly thereafter we witnessed the introduction of an even better VCR, the HiFi VCR, which provided enhanced quality in pre-recorded, home video entertainment with superb audio, as well as a means for recording and playing high quality audio entertainment. This changed television forever; however, the TV had seen much progress and success on its own and had already evolved into a "Digital" component. The digital TV can be found in a variety of styles and sizes, from the palm sized hand-held type to a six story giant. A HiFi VCR and digital TV proved to be vital necessities for a great home theater system, while in the meantime the drive-in theater had become less appealing to the average entertainment-seeker and faded into the past as if it were a dinosaur. With no remorse, the home theater era has not missed a beat. Undoubtedly this technology is partly responsible for the decline of the drive-in theater.

By the year 2000, the digital home theater system manufacturers had introduced digital video disc technology, which provides the best yet quality in audio/video entertainment by means of digital video discs and a digital video disc player (reader). The digital TV and DVD player are primary components within a premier home theater entertainment system.

Also by the turn of the century, just as the television had changed the world, the personal computer, another product of the technological revolution, has also made our world a different place, while bringing about the information age. Among its thousands of functions the PC is also capable of receiving and encoding "streaming" audio/video entertainment information over a telephone line or reproduction from a disc and is a superb tool for performing AudioNideo PC convergence. This also provides versatile, unsurpassed digital AudioNideo quality that can be reproduced and displayed in many different ways.

The drive-in theater plays an important role in American history and although most are out of commission, audio/video entertainment would not have evolved into the phenomenon it is today without it. Beginning around the late 1950s the drive-in theater, had become a very popular attraction for moviegoers, having an organized parking arrangement, with a parking stall and speaker post for each visiting automobile. Vehicles park facing a platform onto which a giant motion picture image is projected by a dense beam of light, filtered through a roll of film and projected against a white, smooth, flat surface to create a moving image via a motion picture projection device. Positioned in an area adjacent to the projection surface, normally behind the vehicles while the corresponding audio is transmitted through a speaker box via wire, containing a small single speaker system. This box affixes to the automobile's door after retrieval from the speaker post to supply the audio for the cinema feature, or a radio broadcast is transmitted by the theater via AM or FM radio frequency to be received by the patrons automobile radio. Once upon a time, for a long time, drive-ins proved to be a great source of cinema entertainment for millions of people all across America and certainly have played a major role in the shaping of the way we view audio and video entertainment today. However, it now seems that the drive-in theater's reign has passed.

Because of the technological revolution in which we live, our more diverse world demands a continuous quest for efficiency. This is only one of the reasons why the home theater system is responsible for the decline of the drive-in theater. Unlike drive-ins, DVD home theater systems create a surprisingly involving home theater experience. Besides being space- and cost-efficient, these systems are of separate components and are extremely easy to set up and use. A basic DVD home theater system consists of a DVD player/receiver component with Dolby digital decoding, five pre-matched speakers, a subwoofer, and a television. This type of system produces exceptional, top of the line audio/video quality in the home theater entertainment arena. High quality surround sound automobile stereo system creates similar sound dynamics and giant screen video monitors are being manufactured with top of the line video imagery, such that the home theater system no longer had to remain at home.

The drive-in theater, once a very popular attraction for moviegoers, was just that, an attraction for moviegoers and only moviegoers. Even for its time, whether listened to from a speaker box or received over the radio, the audio quality was very poor and did not seem to coincide with the giant motion picture image displayed on the projection surface. Furthermore, the drive-in's movie projection system presented a giant motion picture image but the quality of the images rarely went without criticism, either the image was not in focus, not bright enough, or was jumping in and out of frame. In many cases there was even structural defects within the projection surface.

The DVD home theater system is a great source of home entertainment and will have much success in the years to come. The DVD home theater system creates a surprisingly involving home theater experience. However, it is so enjoyable it tends to confine one to the home, which is said to be unhealthy, and build relationship gaps between the family's home theater fanatic and auto stereo enthusiast.

The drive-in theater, the DVD home theater system and the surround sound automobile stereo system are great inventions of our time, however, neither in and of itself can produce the same effects as the present invention and all lack the qualities and benefits described herein.

BRIEF SUMMARY OF THE INVENTION

In accordance with a preferred embodiment of the present invention an automobile audio-visual theater system comprises a digital monitor, one or more audio-video media players, a line connecting the video signal of the one or more audio-video media players to the digital monitor, a line connecting the audio signal of the one or more audio-video players to an audio signal splitter having multiple live out signals, and a connection from a live out signal of the audio signal splitter to an automobile's audio system.

In accordance with another preferred embodiment of the present invention, a process for enhancing and combining automobile audio and video entertainment comprises a high definition, giant screen video monitor, or a means for reproducing images on a much larger scale with means of high definition video imaging, a video imaging computer, for audio/video-PC convergence, or a means for computed audio/video-convergence, a DVD player, primary and secondary, or a means for reading optical audio/video discs, with backup, a DTV tuner, primary and secondary, or a means for receiving and converting electromagnetic audio/video signals, with backup, a HiFi VCR, primary and secondary, or a means for playback of high quality audio/video magnetic tape, with backup, a digital audio/video signal mixer, switching mechanism for smoother transitions between applications, or a means for mixing the audio/video signals, for smoother transitions between applications, a digital receiver, primary and secondary, or a means for receiving, converting, selecting and amplifying the said audio/video signals, with backup, an audio/video signal splitter, multiplexor device to create multiple audio/video signals, or a means to multiply the said audio/video signals, the system control center, to house, power and control the system components, or a means to house, power and control the system components, the "Video Jockey", to operate, control and oversee the system components, or a technician, to operate, control and oversee the system parameters, the audio/video signal cables, supplied by the system control center to thereby transfer the multiple audio/video signals to the dance and social area and respective vehicles, or a means to transfer the said multiple audio/video signals from the system components to an independent speaker system, located within a designated dance and social area, and respective vehicles automobile stereo systems, the parking arrangement, positioned in a half-moon, stadium type design and centered on the giant screen video monitor, or a means for an organized parking arrangement, in relation to the said giant screen video monitor, and the system integration wiring device, pre-installed into the patron's automobile, and therefore creating the predetermined connection receptacle of the auto stereo system, video optional, or a means to integrate the said audio/video signals with the said automobile, stereo systems, video optional.

The automobile audio-video theater system provides an endless variety of audio/video entertainment such as music videos, digitally formatted movies and live performances including concerts, plays and sporting events. It provides entertainment for many groups of people with different entertainment peripherals, especially those who thought a great video experience could only happen at home. The automobile audio-video theater system provides a social haven for, as well as facilitates, the auto stereo enthusiast thus promoting the reduction of noise pollution on our streets. It also provides unsurpassed entertainment for the auto stereo/video enthusiast while creating more interaction with the theater itself by means of providing total control over the sound dynamics and volume of the featured event from the comfort of ones own vehicle. It provides prospective patrons with a standard onetime vehicle audio system precheck and "Interface Access" install procedure. It provides patrons access to the theater's high quality sound system without interfering with the normal operation of the auto stereo system. It provides patrons a parking arrangement with the choice of occupying either an open or a private stall for their viewing and listening pleasures. The theater provides patrons easy access to its system by retrieving the audio/video signal cable and making a simple connection to the predetermined connection receptacle of the auto's stereo system. This supplies the high quality audio for the featured event to the automobile. It provides a dance and social area for the free spirited music video lover as well as accommodations for the social mingler. It also provides a theater perimeter with a tall, impact resistant, soundproof barrier to ensure a minimal of escaping sound waves and thus dramatically decreasing the impact of the multiple automobile, stereo audio beyond the premises of the theater.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE SEVERAL DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a system block diagram of an automobile audio-visual theater system in accordance with a preferred embodiment of the present invention.

Figure 2:
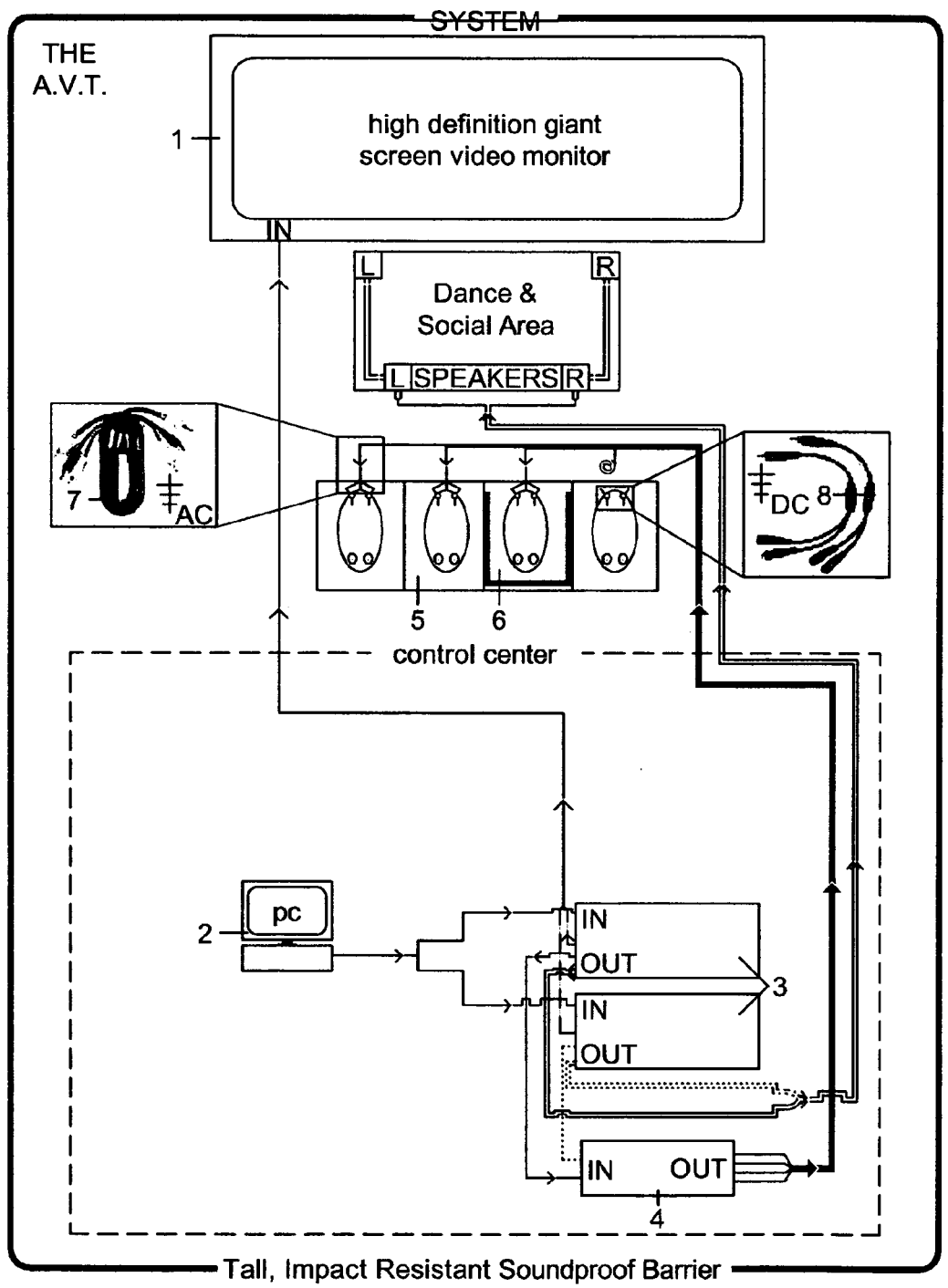
Figure 2 is a schematic block diagram of a process for enhancing and combining automobile audio and video entertainment.

FIG. 2 is a system block diagram of an alternate automobile audio-visual theater system in accordance with a preferred embodiment of the present invention.

FIG. 3 is a schematic block diagram of a process for enhancing and combining automobile audio and video entertainment, showing how to interface the Automobile audio-video theater with a person's auto stereo system in accordance with a preferred embodiment of the present invention.

DETAILED DESCRIPTION OF THE PREFERRED EMBODIMENTS

Detailed descriptions of the preferred embodiments are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

In the present form of the invention, an automobile audio-visual theater system comprises a digital monitor, one or more audio-video media players, a line connecting the video signal of the one or more audio-video media players to the digital monitor, a line connecting the audio signal of the one or more audio-video players to an audio signal splitter having multiple live out signals, and a connection from a live out signal of the audio signal splitter to an automobile's audio system.

The system may include a high definition, giant screen video monitor or other means for reproducing images on a much larger scale with means of high definition video imaging is shown with a video imaging computer, or other means for computed audio/video-convergence; a DVD player, primary or secondary or other means for reading optical audio/video discs, primary and secondary; a DTV Tuner, primary or secondary or other means for receiving and converting electromagnetic audio/video signals, primary and secondary; a HiFi VCR, primary or secondary or other means for playback of high quality audio/video magnetic tape, primary and secondary; a digital audio/video Signal Mixer; a switching mechanism or other means for mixing the audio/video signals, for smoother transitions between applications; a digital receiver, primary or secondary or other means for receiving, converting, selecting and amplifying the said audio/video signals, primary and secondary; and an audio/video signal splitter, multiplexor device to create multiple audio/video signals or other means to multiply the said audio/video signals. The system control center, to house and power the system components or other means to house and power the system components. The video jockey is to operate, control and oversee the system or a technician to operate, control and oversee the system parameters. The audio/video signal cables, supplied by the system control center is to thereby transfer the multiple audio/video signals to the dance and social area and respective vehicles or other means to transfer the said multiple audio/video signals from the system components to an independent speaker system, located within a designated dance and social area, and respective vehicles automobile stereo systems.

The parking arrangement, positioned in a half-moon, stadium type design and centered on the giant screen video monitor or other means is for an organized parking arrangement, in relation to the said means for reproducing images on a much larger scale. The system integration wiring device, pre-installed into the patron's automobile, and therefore creating the predetermined connection receptacle of the auto stereo system or other means to integrate the said audio/video signals with the said automobile stereo systems is also shown.

In accordance with the present invention, FIG. 1 shows a schematic block diagram for a process for enhancing and combining automobile audio and video entertainment. Each element illustrated within the drawing, with the exception of the parking arrangement's "private stall", already exists and is known to the audio/video entertainment industry. The Y-cable adapter is commonly used as an accessory for high quality/high power auto stereo systems but has never been recorded as a means to integrate automobile audio with video entertainment by way of equipment with an AC power source combined with the DC powered auto stereo system.

The automobile audio-video theater system presents a form of entertainment that compliments and enhances other forms of entertainment by virtue of a high definition, giant screen video monitor, combined with the clear, crisp sounds of the patron's high quality, surround sound automobile stereo system. The theater gives one the best of all worlds: the clear, crisp, high quality surround sound of a boastful auto stereo system, with the view of a brilliant, high quality, high definition giant screen picture and the comfort-and control-of one's own vehicle.

The automobile audio-video theater system features an endless variety of events such as music videos, digitally formatted movies, and live performances including concerts, plays and sporting events.

As shown in FIG. 1, the system itself consists of 1) a high definition, giant screen video monitor, 2) a surround sound source made up of A) a DVD player; primary and secondary, B) a DTV tuner; primary and secondary, or C) a HiFi VCR; primary and secondary (depending on the application of the featured event) 3) a digital, audio/video signal mixer, 4) a Digital Receiver; primary and secondary, and 5) an audio/video signal splitter, integrated with the surround sound systems of the patron's automobiles. The system's source and other components are housed and powered by the system control center, located in full view of the giant screen and is operated, controlled and overseen by the "videojock technician". Also, in full view of the giant screen, is the theater's parking arrangement, positioned in a half-moon, stadium type design and centered on the screen (with varying distances) and fully complete with both 6) open stalls (without barriers) as well as 7) private stalls with barriers, comprised of a tall, three sided, impact resistant, soundproof partition lined with a special impact absorbing material and encloses the sides and rear of respective vehicles. This minimizes unwanted contact from other theater patrons while blocking out other auto stereo sound waves thus offering a nice sense of isolation and privacy while viewing the featured event (without obstructions to the line of sight of the giant screen).

Upon arrival to the favorite viewing position, the patrons gain access to the system by retrieving 8) the audio/video signal cable, (supplied by the system control center and adapted to be connected to the automobile's audio/visual systems) and making a simple connection to the predetermined connection receptacle of the auto stereo system (video feed optional for vehicles with separate onboard video monitors), via 9) a special system integration wiring device (set of Y-cable adapters) adapted to be connected to the automobile's audio/visual systems. This device couples the theater's (encoded) digital audio signal with the path of the auto stereo audio signal and is pre-connected to the auto stereo system by a various set of pre selected signal input receptacles, (preferably, but not limited to, the Auxiliary Input receptacles) during the onetime vehicle audio system precheck and "Interface Access" install procedure. This supplies the high quality audio for the featured event to the automobile without interfering with the normal operation of the auto stereo system. Aside from having the best seat in the house, it also allows the patron to maintain full control over the sound dynamics and volume of the featured event. Moreover, to accommodate the free spirited music video lover as well as the social mingler, the theater also provides a dance and social area, comprised of a dance floor with an independent speaker system and seating section. The perimeter of the compound is composed of a tall impact resistant, soundproof barrier to ensure a minimal of escaping sound waves and thus dramatically decreasing the impact of the multiple automobile, stereo audio beyond the premises of the theater.

FIG. 2 shows a process for enhancing and combining automobile audio and video entertainment consisting of 1) a high definition, giant screen video monitor, 2) a video Imaging personal computer (for audio/video-PC convergence), incorporated as the surround sound source and mixer of the automobile audio-video theater system, 3) a Digital Receiver; primary and secondary, and 4) an audio/video signal splitter, integrated with the surround sound systems of the patron's automobiles, 5) open stalls (without barriers) as well as 6) private stalls with barriers, comprised of a tall, three sided, impact resistant, soundproof partition lined with a special impact absorbing material and encloses the sides and rear of respective vehicles. Again, this minimizes unwanted contact from other theater patrons while blocking out other auto stereo sound waves thus offering a nice sense of isolation and privacy while viewing the featured event (without obstructions to the line of sight of the giant screen). Upon arrival to the favorite viewing position, the patrons gain access to the system by retrieving 7) the audio/video signal cable (supplied by the system control center and adapted to be connected to the automobile's audio/visual systems) and making a simple connection to the predetermined connection receptacle of the auto stereo system (video feed optional for vehicles with separate onboard video monitors), via 8) a special system integration wiring device, (set of Y-cable adapters) adapted to be connected to the automobile's audio/visual systems. This device couples the theater's (encoded) digital audio signal with the path of the auto stereo audio signal and is pre-connected to the auto stereo system by a various set of pre selected signal input receptacles, (preferably, but not limited to, the Auxiliary Input receptacles) during the onetime vehicle audio system precheck and "Interface Access" install procedure. This supplies the high quality audio for the featured event to the automobile without interfering with the normal operation of the auto stereo system and once again, the special system integration wiring device also allows the patron to maintain full control over the sound dynamics and volume of the featured event.

FIG. 3 is a schematic block diagram of a process for enhancing and combining automobile audio and video entertainment. This diagram shows how to interface the Automobile audio-video theater with a person's automobile stereo system and consists of 1) the system control center, to house and power the system's source and other components. 2) an audio/video cable (supplied by the system control center and adapted to be connected to the automobile's audio/visual systems). This cable is connected to the predetermined connection receptacle of the auto stereo system, (however, the cable itself is adapted so that the AC grounded shield does not continue beyond the audio/video cable) and therefore transfers the audio/video signals to the automobile's, DC powered stereo system without AC-DC conflict, via 3) a special system integration wiring device or set of preinstalled Y-cable adapters, adapted to be connected to the automobile's audio/visual systems (during the onetime vehicle audio system precheck and "Interface Access" install procedure). This serves as the predetermined connection receptacle of the auto stereo system by supplying spare audio input connecters (video feed optional for vehicles with separate onboard video monitors) and thereby, upon connection, transfers the signals, preferably, but not limited to 4) the automobile stereo receiver, Auxiliary Input connection receptacles, (standard in most high quality, auto stereo systems). This supplies the high quality audio for the featured event to the automobile without interfering with the normal operation of the auto stereo system. And 5) the automobile stereo, auxiliary component, (usually a C D or cassett tape player, (inactive during theater configuration) is kept in a direct connection configuration with the auto stereo receiver. Moreover, due to the relatively simple instsllation procedure of only raplacing the standard RCA cable adapter with two similar Y-cable adapters, it is reasured that this will not interfere with the normal operation of the auto stereo system in any way, but on the contrary The preinstalled Y-cable adapters (connected between the auxiliary component's, audio output connecters and the auto stereo receiver's, audio input connecters) offers the spare audio input connecters necessary, onto which the audio signal cables, supplied by the (active) system control center, attach. Upon this attachment and with the auto stereo receiver placed in it's auxilliary mode, (but with the automobile stereo, auxiliary component inactive), the connection virtually splices together the theater's audio signal with the audio path of the Automobile stereo system thus interfacing the theater with the person's auto stereo system. This interface provides the patron with full control over the sound dinamics and volume of an endless variety of audio/video entertainment.

From the foregoing it will be seen that upon any given moment, a theater patron can walk in and visit the dance and social area or drive in and essentially occupy an open or a private stall by retrieving and making the simple connection of the audio/video signal cable to the predetermined connection receptacle of the auto stereo system and gain access to the automobile audio-video theater system.

Originating at the system source, the audio/video signal is passed along to the audio/video signal mixer which determines what source is primary, then passes it through the system to the giant screen video monitor while sending a duplicate signal to a receiver, which in turn sends the signal to the speaker system of the dance and social area. Upon this, the receiver also sends the signal to the audio/video signal splitter for multiplication. The signals are then transferred, via audio/video signal cables and the pre-installed "system integration wiring devices" to the auto stereo systems thus providing an endless variety of audio/video entertainment to the patrons of the automobile audio-video theater system.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A system for enhancing and combining automobile audio and video entertainment comprises:
   a high definition, giant screen video monitor; for reproducing images on a much larger scale with means of high definition video imaging;
   a video Imaging computer, for computed audio/video-convergence;
   a DVD player, primary and secondary; or a means for reading optical audio/video discs;
   a DTV Tuner, primary and secondary; for receiving and converting electromagnetic audio/video signals;
   a HiFi VCR, primary and secondary; for playback of high quality audio/video magnetic tape;

a digital audio/video signal mixer, switching mechanism for mixing the audio/video signals, for smoother transitions between applications;

a digital receiver, primary and secondary; for receiving, converting, selecting and amplifying the said audio/video signals;

an audio/video signal splitter, multiplexor device to create multiple audio/video signals;

the system control center, to house and power the system components;

the video jockey, to operate, control and oversee the system components;

the audio/video signal cables, supplied by the system control center to thereby;

transfer the multiple audio/video signals to the dance and social area and respective vehicles; to transfer the said multiple audio/video signals from the system components to an independent speaker system, located within a designated dance and social area, and respective vehicles automobile stereo systems;

the parking arrangement, positioned in a half-moon, stadium type design and centered on the giant screen video monitor; or a means for an organized parking arrangement, in relation to the said giant screen video monitor; and the system Integration wiring device, pre-installed into the patron's automobile, and therefore creating the predetermined connection receptacle of the auto stereo system; or a means to integrate the said audio/video signals with the said automobile, stereo systems.

* * * * *